Figure 1:
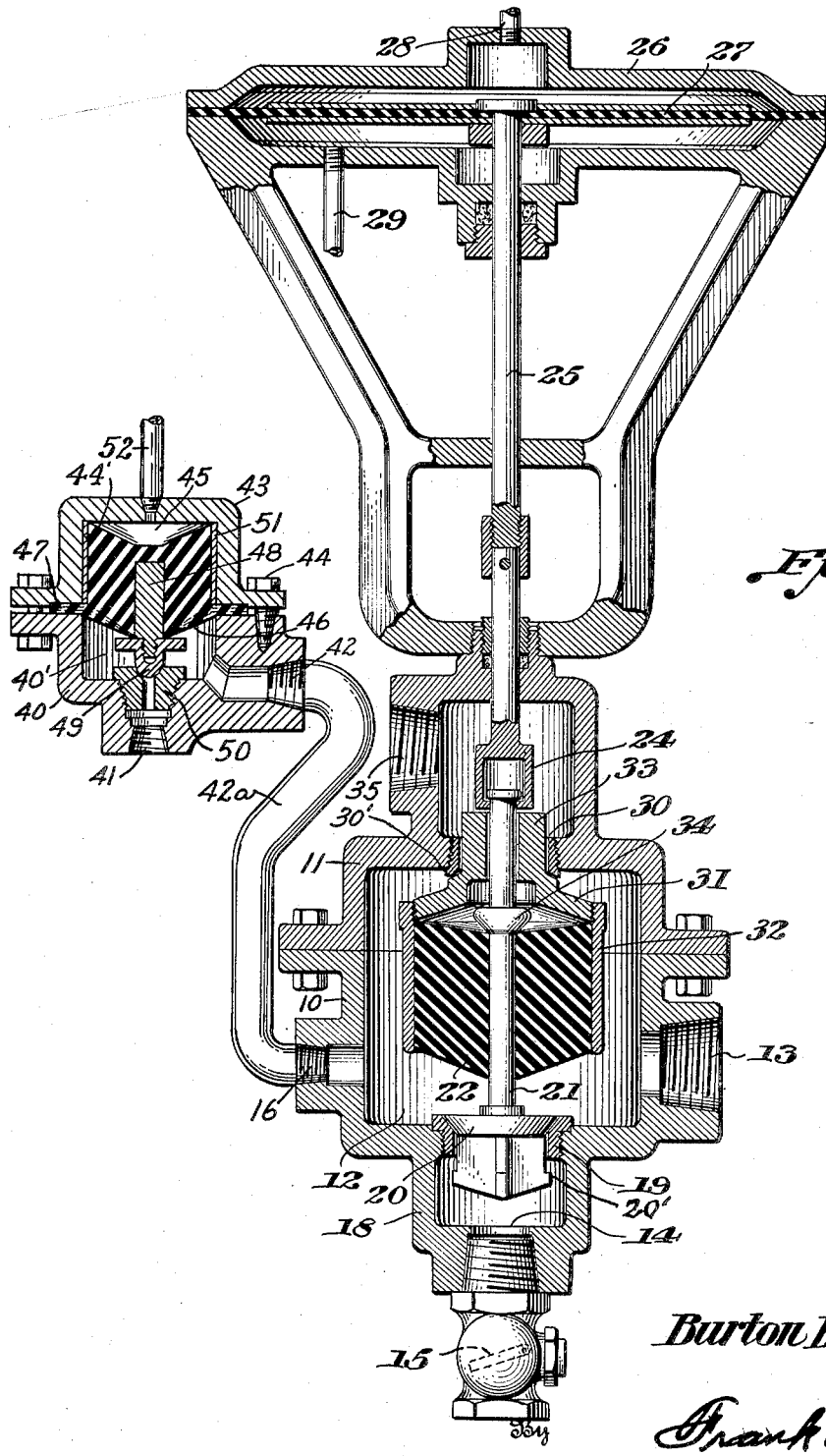

Dec. 30, 1952     B. D. MORGAN     2,623,535
VALVE CONTROL MECHANISM

Filed Dec. 6, 1944     2 SHEETS—SHEET 1

Inventor
Burton D. Morgan,

Frank W. Dahn,
Attorney

Dec. 30, 1952     B. D. MORGAN     2,623,535
VALVE CONTROL MECHANISM
Filed Dec. 6, 1944     2 SHEETS—SHEET 2
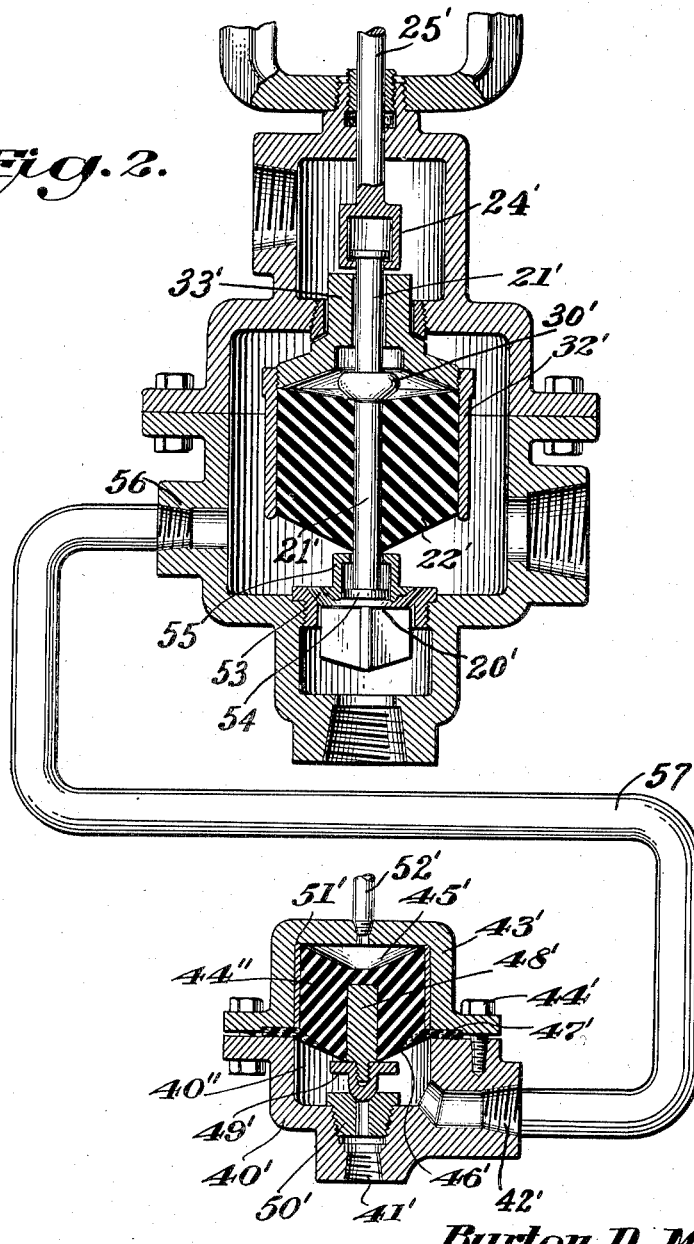

Patented Dec. 30, 1952

2,623,535

UNITED STATES PATENT OFFICE 2,623,535

VALVE CONTROL MECHANISM

Burton D. Morgan, Evanston, Ill.

Application December 6, 1944, Serial No. 566,897

4 Claims. (Cl. 137—114)

My invention relates to control means for hydraulic presses and the like, and it is an object of the same to provide improved means whereby fluid from two independent sources and under different degrees of pressure may be applied in economical and effective manner to a hydraulic press or other like mechanism wherein it is desirable first to apply fluid under low presure until the ram of the press, for example, comes up against the work and then to cause fluid under high pressure to complete the stroke of the ram.

Another object of the invention is to utilize rubber in shear to serve as a spring means for actuation of certain valves in the control means.

Another object of the invention is to provide for the utilization of a bushing of rubber or the like as a means for supporting and guiding a valve stem.

Another object of the invention is to provide a control means which does away with the use of high pressure packing.

Another object is to provide an automatic inlet valve that shall not require adjustment in order to operate with different low pressures, it being well known that low pressure in some situations means 100# per square inch, whereas in others it means 500# per square inch, thus making adjustments necessary where conventional spring loaded valves are used.

Another object is to provide improved means wheerby two coaxial valves can be so operated as to close both of their ports simultaneously, as, for example, for the purpose of stopping the ram of a press at any desired elevation.

A primary object of the invention is to save pressure fluid in the operation of a press by using low pressure water in a pressure chamber until the press is closed and then having high pressure water applied automatically after the ram has stopped and the pressure has built up in the pressure chamber, all with simple and direct means.

Other objects and advantages of the invention will appear from the following specification and the annexed drawings which are made a part of this application and in which similar reference characters indicate similar parts.

Referring to the drawings:

Fig. 1 is a vertical section of a preferred form of the invention, and

Fig. 2, a similar partial vertical section of a modified form of the invention.

In the drawings, reference character 10 indicates a valve body having a header 11 bolted thereto and forming therewith a chamber 12 for containing the fluid for operating the mechanism connected to said control means, as by means of the port 13 which leads to a press or the like. Another port 14 is provided at the lower end of the valve in a header formed integral with the valve body 10 as here shown, this port being provided by a fitting threaded into the valve body and provided with a check valve of any suitable or conventional type, the check valve being indicated at 15.

The valve body is also provided with a high pressure inlet port at 16, and a waste outlet is shown at 35 in an extension of the header 11, this leading to a sewer or the like.

A downward extension 18 of the valve body provides a passage leading up from the port 14 and a suitable renewable valve seat 19 is provided at the lower end of the chamber 12 for a low pressure valve 20 on a stem 21 that passes through a bushing of rubber 22 and is bonded thereto and guided thereby in its reciprocating movements. At its upper end the stem 21 is connected by a lost motion means 24 to another valve stem section 25 that is suitably guided in and supported by a frame that provides a chamber 26 for a diaphragm 27 secured to the stem 25 in any suitable manner and having any desirable or conventional structure. The diaphragm chamber 26 is provided with an inlet 28 above the diaphragm which inlet is connected to a source of low pressure and an inlet 29 below the diaphragm that may be connected to the same source of pressure, both sides of the chamber being adapted to receive pressure to move the stem 25 either up or down, and being adapted for operation by a suitable control valve, such as, for example, the valve shown in the patent to Ross, 1,486,303, November 12, 1924.

At the upper end of the chamber 12 a renewable seat 30 is provided for a valve 30' formed as a shoulder on an inverted cup-like member 31 having a mantle 32 threaded to its lower end, which mantle may be bonded to the outside of the rubber spring 22, though not necessarily so. Part 31 has a neck or hollow stem 33 passing up through the seat 30 for guiding the valve 30' to its seat immediately below said neck, and a bead or collar at 34 on the stem 21 is movable with said stem and limits its upward movement by engaging with the top of a recess in the part 31. The valve 30' is adapted to close an exhaust passage 35 leading to a sewer or the like, whereas the port 14, in the present embodiment of the invention, affords an inlet for low pressure fluid and it will be seen that the rubber bushing 22 acts to guide the valve stem and also acts on both of said valves to close them and to hold them so closed, except as hereinafter explained. Stops 20' on the guide fins of the valve 20 prevent excessive opening movement of the valve.

Any suitable means for supplying fluid under high pressure may be connected to the port 16 of Fig. 1, but I have shown an improved automatic inlet valve device which is at present preferred by me. This valve device comprises a casing 40 provided with a chamber 40' and an inlet port 41' for high pressure fluid and a double-purpose port 42 connected, as by a pipe 57, to the high pressure inlet port 16 of Fig. 1 (or 56 of Fig. 2) but which automatic inlet valve may of course be used with any other device or mechanism where an automatic inlet for high pressure fluid is required.

A header 43' is fixed to the casing 40 by means of bolts 44' or any other fastening means affording ready access to the interior of the casing. A rubber bushing 44' is located in the chamber provided by the casing and the header, this bushing being generally similar in shape and structure to that at 22, but differing in details. The bushing 44'' is cylindrical in shape as is that at 22 and has a conical cavity 45 at its upper end and a conical extension 46' at its lower end, but it has an annular fin 47' that is adapted to be clamped between the adjacent annular ends of the casing and the header and which serves as a gasket. It further has a central hole extending only partly through the rubber body from the lower end for receiving a stem 48 to which the rubber is preferably bonded, and which stem has a renewable head 49 threaded on its end, said head being rounded to close the passage 41' for high pressure fluid by seating on a removable seat 50'. The rubber body has a mantle 51' of any suitable metal or other material interposed between it and the adjacent wall of the header, which mantle may be bonded to the bushing 44'' and which serves to reinforce the bushing. A passage 52' at the top of the header is connected to the source of low pressure.

In the modified form of the invention shown in Fig. 2, all parts may be identical with those of Fig. 1, including the stem 21', the mantle 32', the elastic bushing 22' of rubber or analogous material, the chamber 40', the resilient bushing 44', etc., but the valve 53 instead of being rigidly secured to the stem 21' is connected thereto by a lost motion connection comprising a fixed collar 54 on the stem and a loose socket 55 on the valve, the automatic inlet valve having its port 42' connected to port 56 of the main valve by means of a pipe 57.

In the operation of the device of Fig. 1, assuming that the mechanism is provided with some suitable means for controlling the ingress of fluid pressure to the passages 28 and 29, pressure is admitted to the diaphragm chamber at the under side of the diaphragm, thereby lifting the valve 20 through the positive connections shown. The low pressure fluid opens the check valve 15 and the fluid under low pressure enters through the port 14, filling the chamber 12, and then passes through port 13 to the press or other mechanism to be operated and to the automatic inlet valve, the low pressure entering the chamber 45 of the automatic inlet control valve to hold valve 49 closed against the action of the low pressure fluid entering the chamber 40' by way of passage 42a. Thus the ram of the press is raised, e. g., until the work comes into contact with the fixed head of the press. The rubber bushing 2 is, of course, flexed slightly when the valve 20 is opened.

When the ram reaches the limit of its movement under low pressure, or encounters sufficient resistance, the pressure due to the fluid entering chamber 12 at 18 builds up in the chamber 12 and also in the chamber 40' by way of port 16, passage 42a and port 42. When the pressure in chamber 40' reaches desired or predetermined height the rubber spring yields and raises its valve to admit high pressure fluid to chamber 12 by way of ports 41, 42, passage 42a and port 16 and to the press to complete its operation. By reason of the presence of a check valve at 15 the position of the valve 20 during the latter operation is immaterial, and the pressure on the lower side of the diaphragm 27 may be cut off at any time after the high pressure line has begun operations. When so released the rubber bushing will serve to hold both valves 20 and 30' closed, but will also serve to prevent unduly high pressure on the valves. This is owing to the fact that the high pressure in the chamber 12 tends to compress the spring and flatten it or force it toward true cylindrical shape. In effect, this action tends to counteract the force of the high pressure tending to close the valves tighter by an equal force tending to open them, and thus prevents too tight seating.

For lowering the ram upon completion of the pressing operation, the operator admits pressure to the diaphragm chamber above the diaphragm and so forces the stem 25 downward, thereby forcing the lower end of its bottom flange against the adjacent end of neck 33, opening the valve and permitting the pressure in the chamber 12 and connected parts to exhaust through port 35 as well as letting off pressure in the inlet control valve.

The rubber spring 44' closes the high pressure port automatically when the pressure falls in the chamber 40'. By connecting the space at 45 to the source of low pressure this low pressure assists in keeping the high pressure valve closed, and thus it becomes unnecessary to provide any means for adjusting the strength or force of the spring 44' that holds it closed.

A similar operation takes place in the case of the apparatus shown in Fig. 2, but in this case no check valve is needed in the low pressure inlet passage. This is for the reason that when the stem 21' is raised, flexing the rubber spring, it does not necessarily lift the valve 20' but may merely permit the pressure under the valve to raise it and admit low pressure fluid to the chamber above it. When now the action of the low pressure fluid has progressed to the point where the automatic inlet valve for high pressure fluid has opened, the valve 53 will automatically drop back to closed position by reason of its lost motion connections to stem 21' regardless of whether or not the diaphragm or other means acting to lift the stem has been released.

It will be obvious to those skilled in the art that the omission of high pressure packing avoids an important defect in the matter of leakage; that the possibility of closing the low pressure valve and the drain valve simultaneously permits the stoppage of the ram of a press or other like machine part at any stage of its movement under low pressure and permits the parts to be held in arrested position for any desired length of time; that terms such as "rubber" are used in a descriptive and not in a limiting sense; that the operating valve and the automatic high pressure inlet valve may be used independently or in combination; and that many alterations may be made in the mechanisms herein disclosed, all without departing from the spirit of the invention, for which reason I do not limit myself to what is shown in the drawings and described in the specification, but only as indicated in the appended claims.

Having thus fuly described my invention, what I claim is:

1. A mechanism comprising a casing having coaxial valve seats in opposite walls thereof, a valve coacting with one of said seats, a stem on the valve, a cuplike member concentric with said stem and having a shoulder with an oppositely directed valve surface thereon for coacting with the other of said seats, said stem extending through an aperture in the closed end of the cuplike member, and a rubber bushing in shear between the stem and the innerwall of the cuplike member, said bushing being bonded to the stem and to said wall and biasing both valves toward their seats.

2. In a valve mechanism, a casing providing a chamber having oppositely directed alined inlet and outlet openings, oppositely facing alined valves for the respective ports, a valve stem on the inlet valve, a mantle surounding the stem, said mantle having the outlet valve fixed thereto, a body of rubber in shear located between said mantle and valve stem for biasing both valves toward closed position, and an abutment on the stem so located as to bear against the outlet valve when the same is closed and the inlet valve is opened, thereby limiting the opening movement of the inlet valve.

3. Control means for hydraulic presses and the like, comprising a casing having a chamber with a port for admission of low pressure fluid, a waste port for said chamber coaxial with said low pressure port, a port in communication with said chamber between said coaxial ports, a port for admission of high pressure fluid, coaxial valves for controlling said low pressure port and said waste port, connections between said valves including a body of rubber in shear and biased to close both valves, an automatic inlet control valve for the high pressure fluid comprising a casing having a chamber with a high pressure inlet port and an outlet port, a valve for the last-named inlet port, a body of rubber extending across said chamber and connected to the last-named valve for holding it in closed position, a passage connecting the outlet port of the inlet control valve with the high pressure port of the first-named chamber, a cavity above the second rubber body, said cavity being of less transverse extent than the chamber of said inlet control valve, and a passage connecting said cavity to the low pressure fluid of said first-mentioned port.

4. A device as in claim 3, wherein said inlet valve casing is divided transversely into two parts and the rubber body has a circumferential fin clamped between said parts.

BURTON D. MORGAN.

REFERENCES CITED

The following references are of record in the file of this patent:

UNITED STATES PATENTS

| Number | Name | Date |
|---|---|---|
| 957,347 | Kennedy | May 10, 1910 |
| 2,126,707 | Schmidt | Aug. 16, 1938 |
| 2,152,084 | Paine | Mar. 28, 1939 |
| 2,154,477 | Sinclair | Apr. 18, 1939 |
| 2,326,998 | Hosking | Aug. 17, 1943 |
| 2,365,752 | Edwards | Dec. 26, 1944 |